UNITED STATES PATENT OFFICE.

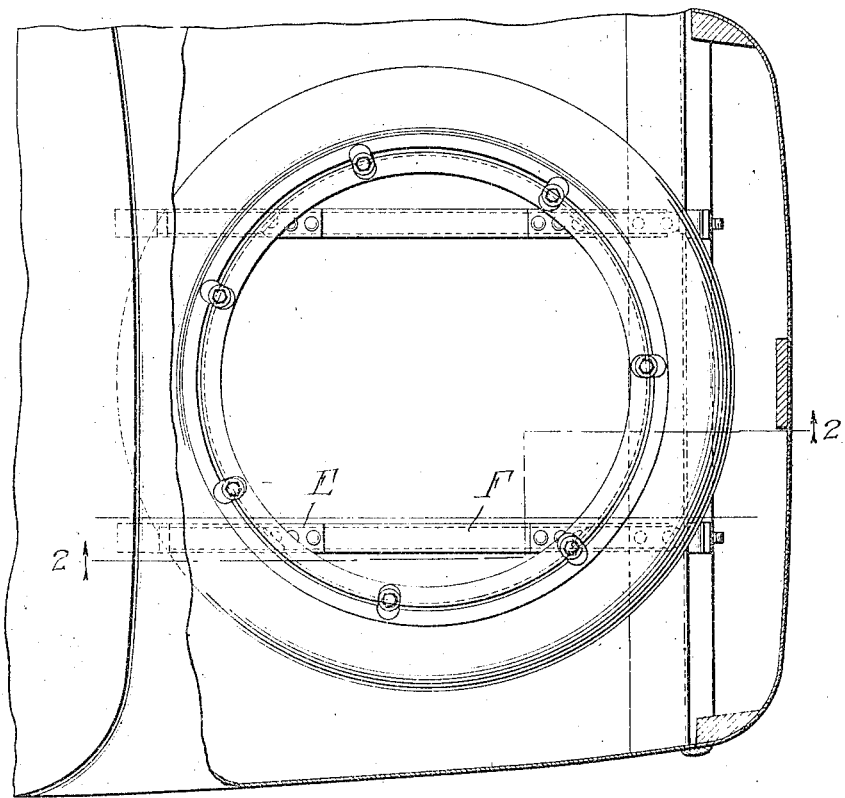
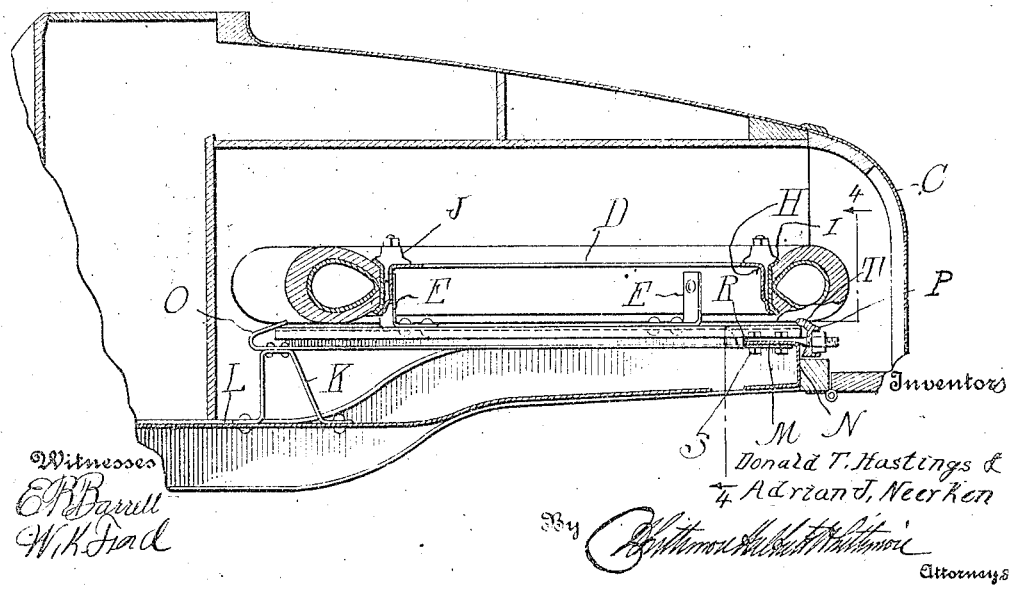

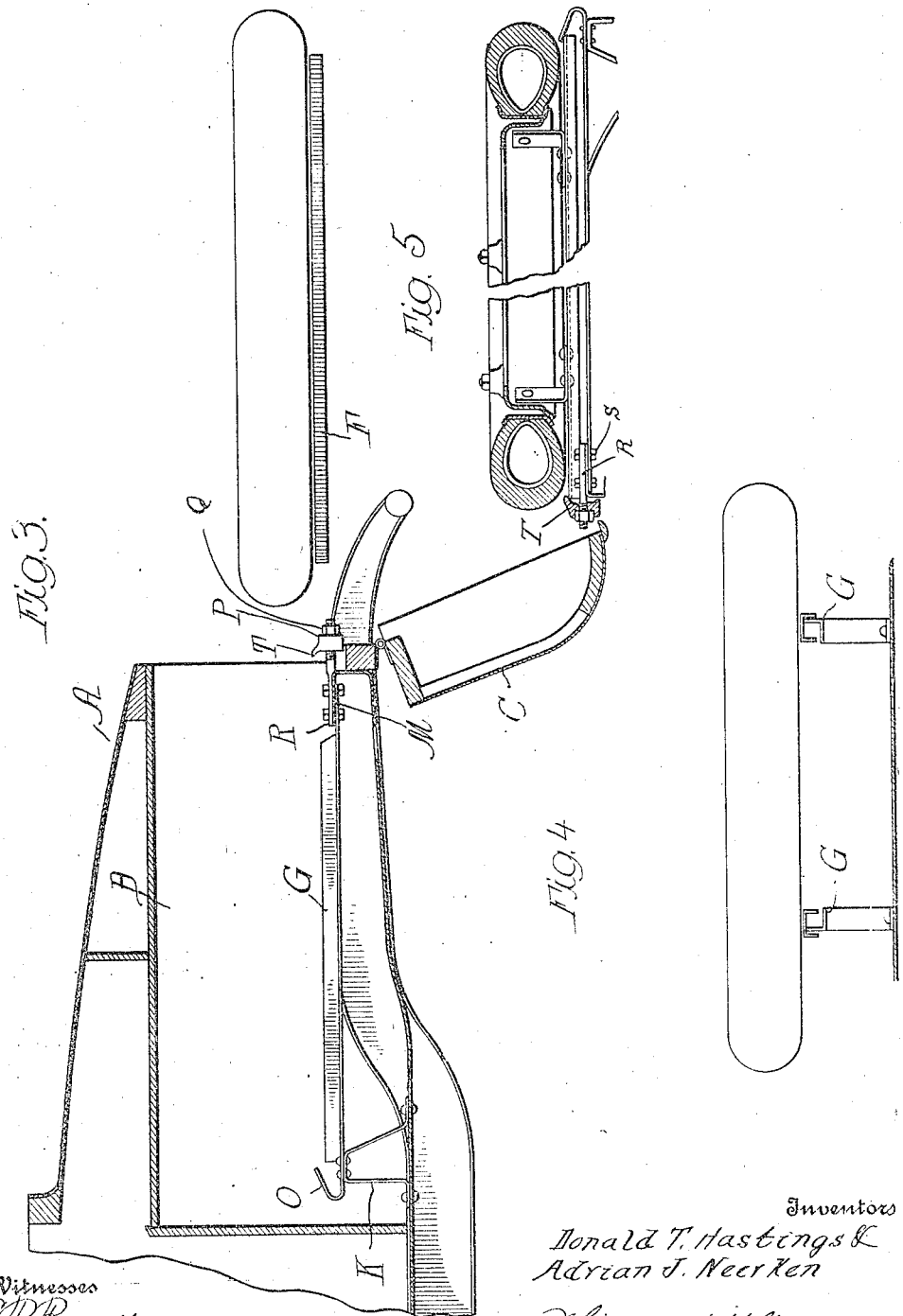

DONALD T. HASTINGS AND ADRIAN J. NEERKEN, OF DETROIT, MICHIGAN, ASSIGNORS, BY MESNE ASSIGNMENTS, TO HUPP MOTOR CAR CORPORATION, OF RICHMOND, VIRGINIA, A CORPORATION OF VIRGINIA.

TIRE-CARRIER FOR MOTOR-VEHICLES.

1,176,894.     Specification of Letters Patent.     Patented Mar. 28, 1916.

Application filed December 4, 1914. Serial No. 875,510.

*To all whom it may concern:*

Be it known that we, DONALD T. HASTINGS and ADRIAN J. NEERKEN, citizens of the United States of America, residing at Detroit, in the county of Wayne and State of Michigan, have invented certain new and useful Improvements in Tire-Carriers for Motor-Vehicles, of which the following is a specification, reference being had therein to the accompanying drawings.

The invention relates to tire carriers for motor vehicles and resides in the provision of a simple and efficient tire carrier that is adapted to be housed within a chamber in the rear portion of the vehicle body; in the provision of such a construction of tire carrier that may be easily removed from or inserted into the tire chamber of the body; to provide a construction of tire carrier which supports the tire solely by the rim and which so holds the tire that the latter is out of contact with the tire carrier and all other portions of the vehicle.

The invention further resides in the novel construction, arrangement and combination of certain parts as will more fully hereinafter appear.

In the drawings, Figure 1 is a sectional plan of a rear portion of a motor vehicle, showing the improvement applied thereto; Fig. 2 is a vertical section of the structure shown in Fig. 1; Fig. 3 is a view similar to Fig. 2, showing the tire carrier removed from the chamber; Fig. 4 is an end elevation; and Fig. 5 is a cross section through the tire holder.

A designates the rear portion of the body of a motor vehicle, B a tire chamber therein and C a door permitting access to the tire chamber. The tire carrier is composed of a rim D supported by means of brackets E upon a pair of spaced members F which are adapted to have a longitudinal sliding engagement with track members G within the tire chamber. The members F are preferably of inverted channel-shaped cross-section, while the members G are of angle-shaped cross-section. The rim D has the periphery H thereof shaped to conform to the contour of the usual felly band of a wheel, and when the rim I of the spare tire is engaged with the member D, it is secured thereto by means of clips J carried by the member D, these clips being of the usual construction employed on the demountable rim. As shown, the inner end of each of the members G is attached to a bracket K supported upon the bottom L of the vehicle body, while the other end of the member G is secured to an inwardly-extending flange M of the up-turned end N of the bottom L.

O are return-bent flanges upon the inner ends of the members G, which diverge upwardly and form arms for the inner ends of the members F.

P are clips at the outer end of the members G which are adjustable through the medium of nuts Q to clamp the members G against the members O. The clips P are carried by studs R attached to the flange M. Preferably the studs R are arranged upon the upper face of the flange M, while the outer ends of the members G are arranged upon the lower face, thereby allowing bolts S to form a common securing means for fastening the members G and R to the flange M.

With the construction heretofore described, assuming that the parts are as shown in Fig. 2, when it is desired to remove the tire carrier, the nuts Q are loosened and the clips P withdrawn, so as to allow the tire carrier to be drawn outwardly upon the track members G. The demountable rim and tire may then be readily removed from the tire carrier. When it is desired to insert the tire carrier, the members F are engaged with the members G and slid longitudinally thereof until the inner ends of the members F abut against the up-turned flanges O. Upon a tightening of the nuts Q the clips P will force the members F against the members O, securely clamping the tire carrier to the track, for as will be noted, the ends of the return-bent portions O engage over the inner ends of the members F, while the clips P are provided with inwardly-extending portions T that engage over the outer ends of the members F.

As will be noted upon reference to the drawings, when the tire is in engagement with the carrier it is supported solely by the rim, so that the tire is out of engagement with the tire carrier and all other portions of the vehicle. This is highly advantageous, since if a portion of the tire is in contact with the carrier or any other part of the vehicle, the vibration of the vehicle produces a rubbing of the tire against the part in contact therewith. It is found that this rubbing action quite frequently wears away the casing, thereby materially weakening the casing at the point or points of contact, which of course, is objectionable.

While the preferred construction of the device has been described, it is not desired to limit the protection to the particular construction illustrated, but the invention is considered to be of sufficient scope to embody various modifications of the structure shown.

What we claim as our invention is:—

1. The combination with a vehicle having a compartment, of an abutment adjacent the inner end of the compartment, a tire carrier insertible into and removable from said compartment, said tire carrier when in said compartment engaging said abutment, a clamp at the outward end of said compartment for holding said tire carrier against said abutment, and a closure for said compartment, said clamp being independent of said closure.

2. The combination with a vehicle having a compartment, of spaced guides in said compartment, abutments at the inner ends of said guides, a tire carrier provided with coöperating spaced guides for engaging the first-mentioned guides and longitudinally slidable thereon, clamps for engaging the outward ends of the second-mentioned guides and adapted to secure the inner ends of said second-mentioned guides against said abutments, and a closure for said compartment, said clamp being independent of said closure.

3. The combination with a vehicle having a compartment, of a pair of spaced guides in said compartment, a second pair of guides slidably engaging the first pair, and a rim rigidly and permanently secured to the sliding guides, maintaining said guides in their proper spaced relation.

4. The combination with a pair of spaced parallel rails mounted upon a vehicle, of a frame for carrying a tire slidably supported by said rails and retained thereby against motion transverse of the rails, an abutment at one end of one of said rails, and a member adjustable longitudinally of the rails for rigidly clamping said frame against said abutment.

5. The combination with a frame for carrying a tire, of a pair of rails mounted upon a vehicle for supporting said frame, and members associated with the respective ends of one of said rails for clamping said frame.

6. The combination with a frame for carrying a tire, of a pair of rails mounted upon a vehicle for supporting said frame, a hook at one end of one of said rails forming an abutment for one end of the frame, a bolt adjacent the other end of said rail, a movable abutment for engaging the other end of said frame, and a nut on said bolt for clamping said movable abutment against the frame.

7. The combination with a vehicle having a track, a frame slidable upon said track, including a rim, and means for rigidly clamping the frame to the track.

In testimony whereof we affix our signatures in presence of two witnesses.

DONALD T. HASTINGS.
ADRIAN J. NEERKEN.

Witnesses:
GRANVILLE C. ALDRICH,
HUGH A. JOHNSON.